United States Patent [19]

Nevin et al.

[11] Patent Number: 4,791,028

[45] Date of Patent: Dec. 13, 1988

[54] POLYMER COATINGS

[75] Inventors: Alan Nevin; Ian Shirley, both of Cheshire, England

[73] Assignee: Imperial Chemical Industries PLC, London, England

[21] Appl. No.: 68,703

[22] Filed: Jul. 1, 1987

Related U.S. Application Data

[63] Continuation of Ser. No. 720,382, Apr. 5, 1985, abandoned.

[30] Foreign Application Priority Data

Apr. 6, 1984 [GB] United Kingdom ............... 8408953

[51] Int. Cl.$^4$ .................. B32B 27/08; B32B 27/18; C08F 6/06
[52] U.S. Cl. ........................ 428/421; 428/411.1; 428/457; 428/473.5; 428/689; 428/698; 427/240; 427/385.5; 427/388.1; 427/393.5; 252/500; 525/326.1; 525/332.1; 525/386; 528/481; 528/497; 528/503
[58] Field of Search ............... 528/396, 481, 497, 503; 525/326.1, 331.9, 332.1, 386; 524/486; 428/462, 411.1, 421, 457, 473.5, 689, 698; 526/411.1, 309; 427/82, 85, 93, 94, 240, 385.5, 388.1, 393.5; 252/500

[56] References Cited

U.S. PATENT DOCUMENTS

| | | | |
|---|---|---|---|
| 3,380,951 | 4/1968 | Frey | 524/486 |
| 3,677,976 | 7/1972 | Miller et al. | 528/396 X |
| 4,225,647 | 9/1980 | Parent | 528/396 X |
| 4,237,246 | 12/1980 | Hsieh | 525/332 |
| 4,454,307 | 6/1984 | Cheshire | 525/379 |
| 4,476,296 | 10/1984 | Ballard et al. | 528/481 |
| 4,508,822 | 4/1985 | Taylor | 435/155 |

FOREIGN PATENT DOCUMENTS 0125767 11/1984 European Pat. Off. ........... 428/462

Primary Examiner—Joseph L. Schofer
Assistant Examiner—F. M. Jeskin
Attorney, Agent, or Firm—Cushman, Darby & Cushman

[57] ABSTRACT

A process for the preparation of a polymer composition which comprises a polyarylene which process comprises treating a first composition comprising a polycyclohexadiene, a suitable additive and a solvent for the polycyclohexadiene to a suitable heat treatment such that at least a major portion of the cyclohexenylene rings in the polycyclohexadiene are converted into aromatic groups.

17 Claims, No Drawings

POLYMER COATINGS

This is a continuation of Ser. No. 720,382, filed 4/5/85, now abandoned.

This invention relates to polymer compositions comprising polymers which contain in-chain aromatic rings and coating and encapsulating layers prepared therefrom.

U.S. Pat. No. 4,476,296 and U.S. Pat. No. 4,454,307 describe the preparation of homo- and co-polymers of certain substituted cyclohexa-1,3-dienes and the conversion thereof into arylene homo- and co-polymers. In our European Patent Specification No. 0,125,767A we describe the use of compositions comprising such arylene polymers as coating and encapsulating layers on at least a portion of a surface of a substrate. One step in the preparation of such coating and encapsulating layers involves the deposition of a layer of a cyclohexa-1,3-diene polymer from a solution thereof in a suitable solvent. The disclosures in the aforesaid patent specifications are incorporated herein by way of reference.

We have now found that the addition to the aforesaid solutions of a suitable additive leads to the preparation of layers of arylene polymers which exhibited improved adhesion to the surface of the substrate.

Further, we have now found that flexible laminated products may be prepared which comprise a layer of an arylene polymer adhering to a flexible layer of a suitable substrate.

According to a first aspect of the present invention there is provided a process for the preparation of a polymer composition which comprises a polyarylene which process comprises treating a first composition comprising a poly-cyclohexadiene, a suitable additive and a solvent for the polycyclohexadiene to a suitable heat treatment such that at least a major portion of the cyclohexenylene rings in the polycyclohexadiene are converted into aromatic groups.

The polycyclohexadiene which is used in the process according to the first aspect of the present invention preferably has a structure which may be represented by the general formula

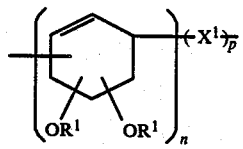   I wherein the cyclohexenylene ring and the residue $X^1$, where $X^1$ is present, may vary from unit to unit along the polymer chain and are distributed along the polymer chain; each $R^1$, which may be the same or different, is hydrogen, aroyl, alkanoyl having up to ten carbon atoms or preferably $R^2OCO$, where $R^2$ is aryl or an alkyl group having up to ten carbon atoms and preferably having one or two carbon atoms; $X^1$ is the residue of one or more polymerisable comonomers as hereinafter defined; n is a whole number; p is 0 or a whole number and the ratio of n:p is more than 4:1.

Polymers of which the polymer compositions prepared by the process according to the first aspect of the present invention are comprised preferably have a structure which may be represented by the general formula

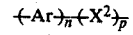   II wherein the residues Ar and $X^2$, where $X^2$ is present, may vary from unit to unit along the polymer chain and are distributed along the polymer chain; Ar represents one or more divalent aromatic groups or substituted divalent aromatic groups; $X^2$ is $X^1$ or a residue derived from the group

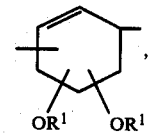

where $R^1$ has the meaning hereinbefore ascribed to it; n and p and the ratio thereof have the values hereinbefore ascribed to them.

Substituents which may be present on the aromatic ring Ar include inter alia lower alkyl groups having up to five carbon atoms, e.g. methyl; lower alkoxy groups having up to five carbon atoms, e.g. methoxy; aryl groups, e.g. phenyl; and halo groups, e.g. chloro.

In polymers of general formula I and II, p is preferably 0.

In polymers of general formula II, Ar is preferably a phenylene ring. The linkages by which the phenylene rings are bonded in the polymer backbone may be ortho or para to each other.

By "polymerisable comonomer" we mean a compound which can be reacted under polymerisation conditions with a 1,2-disubstituted-cyclo-hexa-3,5-diene which has 1,2-substituents as hereinbefore defined to form a copolymer therewith.

Examples of suitable polymerisable comonomers which may be present in copolymers of general formula I or II include inter alia vinyl monomers, for example, olefinic hydrocarbons, e.g. styrene, methacrylates, vinyl halides, vinyl esters, and acrylonitrile; and compounds such as sulphur dioxide.

The suitable additives which are used in the process according to the first aspect of the present invention are organic substances which (a) are soluble in the composition used in the process, (b) are sufficiently involatile such that at least a portion thereof is present in the composition during the early stages of the heat treatment and (c) preferably are compatible with, by which we mean do not phase separate from, the polyarylene at least at the temperature at which the heat treatment is carried out. Where a portion of the suitable additive is present in the polyarylene prepared in the process it preferably has an aromatic structure. The suitable additive preferably comprises a plurality of phenyl rings, e.g. o-terphenyl, m-quinquephenyl or fused phenylene rings, e.g. rubrene, or a compound containing a biphenylene nucleus. However, we do not exclude the possibility that the suitable additive may be polar, e.g. a sulphone or ester.

By "early stages" we mean the portion of the process during which up to 25% of the cyclohexenylene rings are aromatised.

The suitable additive provides between 2 and 20% w/w and preferably 5–10% w/w of the composition used in the process according to the first aspect of the present invention. Often during the process substantially all of the suitable additive is lost, e.g. by evaporation. It will be appreciated that the proportion of the suitable additive which is lost will depend on inter alia the temperature at which the heat treatment is carried out and the volatility of the suitable additive.

It is often preferred that the solvents used in the process according to the first aspect of the present invention are low boiling point solvents, by which we mean solvents which have boiling points below 120° C. As examples of suitable low boiling point solvents may be mentioned inter alia dioxan, ethylene dichloride, acetone and ethyl acetate.

The process according to the first aspect of the present invention may be carried out by subjecting the composition used therein to a suitable heat treatment as described in our aforesaid U.S. patent specifications at a temperature in the range from about 200° C. to 450° C. Where the process is carried out at a temperature at the lower end of the range, up to, say, about 250° C. it is preferably carried out in the presence of an amine, more preferably a tertiary alkylamine, e.g. tri-n-octylamine.

Compositions prepared by the process according to the first aspect of the present invention may contain suitable dopants which render them electrically conducting. Examples of suitable dopants and methods suitable for introducing them into compositions containing in-chain phenylene units are more fully described in our aforesaid European Patent Specification No. 0,125,767A.

Compositions prepared by the process according to the first aspect of the present invention and the polycyclohexadienes used therein are in the form of coatings or encapsulating layers on a suitable substrate.

It is often preferred that the substrate used in the process according to the first aspect of the present invention is sufficiently stable to withstand the heat treatment to which it is subjected in the process without any undue deleterious effect thereto.

As examples of materials from which suitable substrates may be prepared may be mentioned inter alia metals, for example noble metals, e.g. platinum, transition metals, e.g. copper and nickel, engineering metals, e.g. mild steel and aluminium; materials used in the electronic industries, for example, silicon, silicon dioxide, silicon nitride, gallium arsenide, which may have been subjected to a treatment and/or contain an additive known in the art, e.g. a suitable dopant which renders them semi-conducting, e.g. phosphorus or boron; and plastics, e.g. polyimide, polyetherimide, polyethersulphone, polyphenylene sulphide, polyethylene terephthalate, polyetheretherketone, polytetrafluoro-ethylene, and polyvinylidene difluoride. It will be appreciated that the nature of the substrate will influence the choice of conditions under which the process according to the first aspect of the present invention is carried out.

The substrate may be a three-dimensional object, however it is often two-dimensional. For example, it may be in the form of a thin layer which is supported on a suitable support, e.g. a thin layer of silicon dioxide supported on a silicon plate or a thin layer of copper on glass. Methods of forming thin layers on suitable substrates are well known in the electronics art. The two-dimensional substrate may, surprisingly, be flexible, for example it may be in the form of a thin sheet or film and the thin sheet or film may be lamellar, e.g. an aluminised polyethylene terephthalate film, since we have found that coatings comprising compositions prepared by the process according to the first aspect of the present invention adhere well to such lamellar substrates.

According to a second aspect of the present invention there is provided a flexible laminated product which comprises a layer of a polyarylene adhering to a flexible layer of a suitable substrate.

Where the substrate used in the process according to the first aspect of the present invention is, for example, a chip, plate or wafer for use in the electronics industry it may be coated or encapsulated with the composition used in the process according to the first aspect of the present invention using conventional coating or encapsulating techniques. Preferably the coating or encapsulation is applied by a spin process as is more fully described in our European Patent Specification No. 0,125,767A.

Where the substrate is a flexible film a coating comprising the composition used in the process according to the first aspect of the present invention may be applied thereto by conventional techniques such as spraying or dipping.

Substrates coated or encapsulated with compositions used in the process according to the first aspect of the present invention are subjected to a suitable treatment as hereinbefore described to convert the coating or encapsulating layers into compositions comprising a polyarylene.

Where compositions prepared according to the first aspect of the present invention are in the form of coating or encapsulating layers such layers typically have thicknesses between 0.2 and 20 microns.

Compositions prepared according to the first aspect of the present invention may, depending on the specific composition thereon, be used as inter alia a so-called passivating layer, by which is meant a barrier to reduce the deleterious effects of water, ionic impurities and ionising radiation on a substrate; an insulating dielectric, e.g. between active layers of an integrated circuit; conducting or semi-conducting layers, e.g. for reduction of static on polymeric films or as electrodes in solid state batteries.

The polycyclohexadienes which are used in the process according to the first aspect of the present invention may be prepared by the methods described in our aforesaid U.S. patent specifications.

The present invention is further illustrated by the following Examples.

EXAMPLES 1-7

General Procedure

A substrate in the form of a plate or a thin layer supported thereon was baked at 200° C. for 30 minutes in a nitrogen atmosphere.

A polymer of the bis(methylcarbonate) of 1,2-dihydroxy-cyclohexa-3,5-diene (1 part by weight) was dissolved in dioxan; tri-n-octylamine (0.045 parts by weight) and o-terphenyl (0.1 part by weight) were added to the solution and it was filtered through a filter of pore size between 0.2 and 1.0 microns.

A portion of the solution was placed on the substrate surface and the substrate was spun in a conventional spin-coating machine to deposit a coating on the substrate. The solvent was removed from the coating by drying in air at ambient temperature.

The coated substrate was then heated in a nitrogen atmosphere by placing in an oven and raising the temperature continuously.

Completion of the aromatisation reaction was shown by Fourier transform infra-red spectroscopy, in the transmission mode for IR-transparent substrates and by a reflectance method for IR-opaque substrates.

Details of the reaction conditions are given in Table 1.

tensile strength was applied, at a strain rate of 5 mm per minute, perpendicular to the surface of the specimen until the polyphenylene-substrate bond broke.

TABLE 2

| Example No. | Additive | Composition (parts by weight) | | | Substrate | Coating Thickness (microns) | Spin Speed (rpm) | Heat Treatment | | Adhesive Strength (NM$^{-2}$) |
| | | Solvent | CHD$^a$ | Additive | | | | Time (minutes) | Temperature (°C.) | |
| --- | --- | --- | --- | --- | --- | --- | --- | --- | --- | --- |
| 8 | o-Terphenyl | 30 | 10 | 1 | silicon | 1.75 | 7,000 | 10 | 400 | 0.31 |
| 9 | m-Quinquephenyl | " | " | 1 | " | 1.88 | " | " | " | 0.30 |
| 10 | Octyl-benzylphthalate | " | " | 1 | " | 1.93 | " | " | " | 0.32 |
| CT8–10 | — | " | " | 0 | " | 1.85 | " | " | " | 0.16 |
| 11 | o-Terphenyl | 60 | 10 | 1 | " | 1.5 | 2,000 | " | " | 0.34 |
| CT11 | — | " | " | 0 | " | " | " | " | " | 0.18 |
| 12 | o-Terphenyl | 35$^b$ | 10 | 1 | mild steel | 2.5 | 2,000 | 960 | 200 | 0.36 |
| CT12 | — | " | " | 0 | mild steel | 2.5 | " | " | " | 0.20 |

$^a$Poly bis(methyl carbonate) of 1,2-dihydroxycyclohexa-3,5-diene.
$^b$Ethylene dichloride.
CT8-10, CT11 and CT12: Comparative tests.

TABLE 1

| Example No. | Dioxan (parts by volume) | Substrate | Spin speed (rpm) | Coating Thickness (microns) | |
| | | | | Precursor | Polyphenylene |
| --- | --- | --- | --- | --- | --- |
| 1 | 6 | b | 2000 | a | a |
| 2 | 6 | d | 2000 | a | a |
| 3 | 3.5 | b | 3000 | 3 | 0.9 |
| 4 | 3.5 | c | 3000 | 3 | 0.9 |
| 5 | 3.5 | e | 3000 | 3 | 0.9 |
| 6 | 3.5 | f | 3000 | 3 | 0.9 |
| 7 | 3.5 | g | 3000 | 3 | 0.9 | a: Not determined.
b: A layer of silicon dioxide (0.1–1 micron thick) on silicon.
c: As b with the layer doped with phosphorus.
d: A layer of aluminium on silicon dioxide.
e: As b with a surface pattern.
f: As c with a surface pattern.
g: As d with steps of height between 0.7 and 1.0 microns.

EXAMPLES 8–12

The general procedure of Examples 1–7 was repeated except that no tri-n-octylamine was used.

The compositions and conditions used and the results of adhesion tests on the product are given in Table 2. The solvent used was dioxan, except in Examples 12 and CT12 where ethylene dichloride was used. From Table 2 it can be seen that the adhesive strength of laminated products prepared according to the process of the first aspect of the present invention is higher than that of laminated products prepared by known processes.

The adhesive test was carried out by glueing ("Araldite" MY753 (8 parts) and MY 951 (1 part) cured for 60 hours at 25°–30° C. in an atmosphere having a relative humidity of less than 45%) a dolly of 2 cm diameter to the exposed surface of the polyphenylene layer. The specimen was mounted in an Instron tensometer and a

EXAMPLE 13

The procedure used in Examples 8–10 was repeated except that the substrate was a layer of polyimide on silicon instead of neat silicon. A product was obtained which comprised a layer of a polyphenylene adhering well to a layer of polyimide on silicon. A first part of the product was subjected to a "Sellotape" peel test; the polyphenylene coating was not removed. A second part of the product was heated at 110° C. at about atmospheric pressure for 500 hours in water vapour; the polyphenylene coating remained attached to the polyimide layer.

EXAMPLES 14–15

The procedure used in Examples 8–10 was repeated except that the substrate was a polyimide film ("Kapton") of thickness 50 microns.

The compositions and the conditions used are given in Table 3.

TABLE 3

| Example No. | Additive | Composition (parts by weight) | | | Polyphenylene coating Thickness (microns) | Spin Speed (rpm) | Heat Treatment | |
| | | Dioxan | CHD$^a$ | Additive | | | Time (minutes) | Temperature (°C.) |
| --- | --- | --- | --- | --- | --- | --- | --- | --- |
| 14 | o-Terphenyl | 30 | 10 | 1 | 1.20 | 10,000 | 10 | 400 |
| 15 | — | " | " | — | 1.10 | " | " | " |

$^a$Poly bis(methyl carbonate) of 1,2-dihydroxycyclohexa-2,5-diene.

We claim:

1. A process for the preparation of a polymer composition composed of a polyarylene which process comprises at least the steps of:
   (1) depositing on a substrate a layer composed of a first composition which comprises a polycyclohexadiene, an additive, and a solvent, said solvent for the polycyclohexadiene having a boiling point below 120° C.; and
   (2) subjecting said first composition to a heat treatment at a temperature ranging from about 200° C. to 400° C. such that a major portion of the cyclohexenylene rings in the polycyclohexadiene are converted into aromatic groups,
   wherein said additive is an aromatic hydrocarbon or ester which is (a) soluble in the composition employed in said process, (b) is sufficiently involatile so that at least a portion thereof is present in the composition during at least the early stages of said heat treatment step, (c) does not undergo phase separation from the polyarylene at least at the temperatures at which said heat treatment step is conducted, and (d) constitutes between 2 and 20% w/w of said first composition.

2. A process according to claim 1, wherein the polycyclohexadiene has a structure which is represented by the general formula

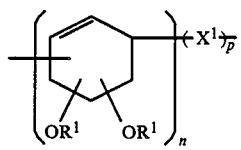

wherein the cyclohexenylene ring and the residue $X^1$ are distributed along the polymer chain; each $R^1$ is, independently hydrogen, aroyl, alkanoyl having up to ten carbon atoms or $R^2OCO$, where $R^2$ is aryl or an alkyl group having up to ten carbon atoms; $X^1$ is, independently, the residue of one or more polymerisable comonomers; n is a whole number; p is 0 or a whole number and the ratio of n:p is greater than 4:1.

3. A process according to claim 2 wherein p is 0.

4. A process according to claim 2 wherein $R^2$ has one or two carbon atoms.

5. A process according to claim 1 wherein the aromatic compound is selected from the group consisting of o-terphenyl, m-quinquephenyl, or rubrene.

6. A process according to claim 1 wherein the solvent is selected from the group consisting of dioxan, ethylene dichloride, acetone and ethyl acetate.

7. A process according to claim 1, wherein said first composition is deposited on a substrate composed of a noble metal.

8. A process according to claim 1, wherein said first composition is deposited on a substrate composed of a transition metal.

9. A process according to claim 1, wherein said first composition is deposited on a substrate composed of mild steel or aluminum.

10. A process according to claim 1, wherein said first composition is deposited on silicon, silicon dioxide, silicon nitride, or gallium arsenide.

11. A process according to claim 1, wherein said first composition is deposited on a substrate composed of a polyimide, a polyetherimide, a polyether-sulfone, a polyphenylene sulfide, polyethylene terephthalate, a polyetherketone, a polytetrafluoroethylene, or a polyvinylidene difluoride.

12. A process according to claim 2, wherein $X^1$ is a residue from a vinyl monomer or an olefinic hydrocarbon.

13. A process according to claim 12, wherein $X^1$ is styrene, a methyacrylate, a vinylhalide, a vinylester or acrylonitrile.

14. A flexible laminated product comprising a layer of polyphenylene and an adhesion enhancing additive adhering to a flexible layer of a suitable substrate, the said additive being (a) aromatic, (b) soluble in a composition comprising polycyclohexadiene and solvent therefor such that cyclohexenylene rings in the polycyclohexadiene are convertible by heat treatment to said polyphenylene, (c) sufficiently involatile such that at least a portion remains in the said composition during the early stages of such heat treatment and such that it (d) does not phase separate from the polyphenylene.

15. A product as claimed in claim 14 in which the layer of a suitable substrate is a film of a plastics material.

16. A product according to claim 14 wherein the additive is an aromatic hydrocarbon or ester.

17. A process according to claim 16 wherein the additive is o-terphenyl, m-quinquephenyl, octyl-benzylphthalate or rubrene.

* * * * *